(No Model.)
W. B. STOVER.
TWO WHEELED VEHICLE.
No. 450,643. Patented Apr. 21, 1891.
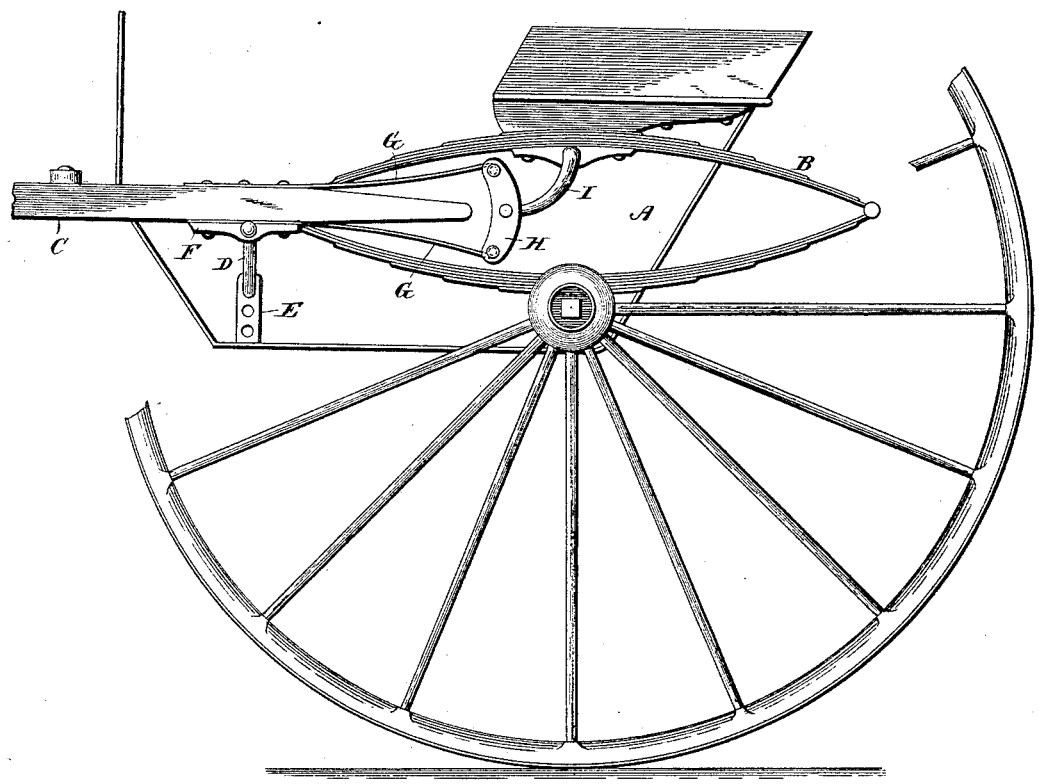
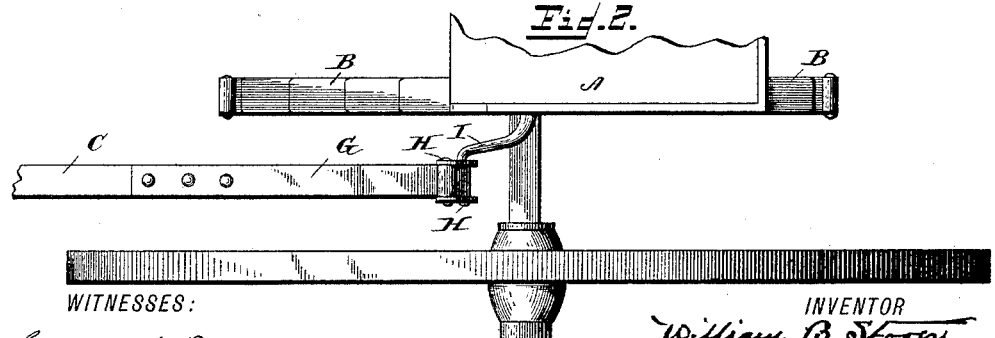
WITNESSES:
Edwin L. Bradford
E. Everett Ellis
INVENTOR
William B. Stover.
BY Wm. C. W. McIntire
ATTORNEY.
THE NORRIS PETERS CO., PHOTO-LITHO., WASHINGTON, D. C.

UNITED STATES PATENT OFFICE.

WILLIAM B. STOVER, OF SOUTH BEND, INDIANA.

TWO-WHEELED VEHICLE.

SPECIFICATION forming part of Letters Patent No. 450,643, dated April 21, 1891.

Application filed January 26, 1891. Serial No. 379,120. (No model.)

*To all whom it may concern:*

Be it known that I, WILLIAM B. STOVER, a citizen of the United States, residing at South Bend, in the county of St. Joseph and State of Indiana, have invented certain new and useful Improvements in Sulkies or Two-Wheeled Vehicles; and I do hereby declare the following to be a full, clear, and exact description of the invention, such as will enable others skilled in the art to which it appertains to make and use the same.

My invention relates to certain new and useful improvements in two-wheeled vehicles, such as dog-carts, gigs, and sulkies, and more particularly to features of construction designed to counteract what is known as the "horse motion" transmitted to the rider through the shafts; and it consists in the details of construction and arrangement hereinafter fully described, and illustrated in the drawings.

In order that those skilled in the art to which my invention appertains may fully understand the same, I will proceed to describe the construction and arrangement of the devices employed to secure the object sought to be effected, referring by letters to the accompanying drawings, in which—

Figure 1 is a side elevation of a cart embodying the features of my invention, and Fig. 2 is a partial plan view of the same.

Similar letters of reference denote like parts in the several figures.

In two-wheeled vehicles as ordinarily made the shafts are connected directly to the axle, upon which is mounted the body, and the latter is of course connected in some suitable manner at the forward portion to the shafts, and as the natural consequence of this arrangement the motion of the horse is communicated to the body of the vehicle and results in great inconvenience to the rider. To obviate this defect in this class of vehicles, quite a large number of improvements have been suggested from time to time, and many patents have been granted for special features of construction, the most practical of which up to the present time being a construction which involves the pivoting of the shafts forward of their rear ends to the forward portion of the body of the vehicle, and providing the shafts on their upper and lower faces at or near their rear ends with flat springs, the free ends of which are adapted to be received within transverse apertures in bearings pivoted to a stationary plate secured to the side of the vehicle-body. While this construction cures some of the defects incident to the most common construction, heretofore referred to, there still remain certain disadvantages which my invention is designed to fully overcome. Among these disadvantages may be mentioned the fact that, owing to the independence of the free ends of the springs at the rear ends of the shafts, the body of the vehicle is free to rock or dip in a very disagreeable manner. The difficulty referred to is entirely overcome by my improvements.

In the accompanying drawings, A represents an ordinary body connected to the axle by an ordinary elliptical spring B in any ordinary or well-known manner.

C are the shafts, which are secured at a suitable distance in advance of their rear ends to the body of the vehicle through the medium of angle or socket-arms D, pivoted adjustably to a permanent plate E, secured to the body A, said plate forming, as it were, a fulcrum upon which the shafts are free to rock; or in lieu of the construction described the angle-arms D may be rigidly connected or made integral with the plate E and may be pivoted in the pillow-block F.

To the upper and lower faces of the shafts C are bolted semi-elliptical springs G, the rear ends of which are connected to studs or otherwise permanently secured to the opposite ends of a yoke H, pivotally connected to an arm I, which in turn is secured by suitable bolts to the under side of the elliptical spring B; or, if preferred, it may in any suitable manner be secured to the side of the body A. From the construction and arrangement shown it will be seen that there is such inter-association of the semi-elliptical springs G that any motion of the body A is communicated to each and both of said springs on each and both sides of the vehicle, and as a necessary consequence the inverse motion of the shafts is communicated to the body through the strength and elasticity of the said springs, and as each of said semi-elliptical springs tends to counteract the motion and force of the other a perfect or at least satisfactory equilibrium is established; or, in other words, the horse motion is arrested before it can reach or be felt by the rider—that is to say, the motion otherwise communicated through the shafts is readily taken up by the semi-elliptical springs G, and all rocking or dipping is avoided.

I do not wish to be limited to the exact details of construction and arrangement shown, as they may be considerably varied without departing from the spirit of my invention, which involves the generic idea of pivoting the shafts at a point in advance of their rear ends, and providing the upper and lower faces of such rear ends with semi-elliptical springs, the rear ends of which are permanently connected to the opposite ends of a rocking yoke or plate, as fully described hereinbefore.

Having fully described my invention, what I claim as new, and desire to secure by Letters Patent, is—

The combination, with a two-wheeled vehicle, of shafts pivoted to the body near the front end thereof and extending back of said pivotal point, semi-elliptical springs secured to the upper and lower faces of the shafts, and an oscillating yoke secured to the main elliptic spring or body of the vehicle and permanently secured to the rear ends of the shaft-springs, substantially as and for the purposes described.

In testimony whereof I affix my signature in presence of two witnesses.

WILLIAM B. STOVER.

Witnesses:
J. L. TAYLOR,
L. R. SKERRITT.